US010028197B1

United States Patent
Ma et al.

(10) Patent No.: US 10,028,197 B1
(45) Date of Patent: Jul. 17, 2018

(54) S9 ROAMING SESSION CLEANUP WITH S9 CONNECTION FAILURE

(71) Applicant: ALCATEL-LUCENT CANADA INC., Ottawa (CA)

(72) Inventors: Haiqing H. Ma, Ottawa (CA); Zhaoliang Z. Ding, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 15/395,736

(22) Filed: Dec. 30, 2016

(51) Int. Cl.
*H04W 36/38* (2009.01)
*H04W 36/00* (2009.01)

(52) U.S. Cl.
CPC ...... *H04W 36/385* (2013.01); *H04W 36/0011* (2013.01)

(58) Field of Classification Search
CPC .......................... H04W 36/385; H04W 36/0011
See application file for complete search history.

(56) References Cited

U.S. PATENT DOCUMENTS

| 2004/0092276 | A1* | 5/2004 | Dooley | H04B 7/022 455/504 |
| 2012/0036257 | A1* | 2/2012 | Mann | H04L 65/1066 709/224 |
| 2012/0102174 | A1* | 4/2012 | Zhou | H04L 12/14 709/223 |
| 2012/0106508 | A1* | 5/2012 | Zhou | H04M 15/00 370/331 |
| 2013/0326061 | A1* | 12/2013 | Li | H04L 12/1407 709/224 |

FOREIGN PATENT DOCUMENTS

WO 2012155774 A1 11/2012

OTHER PUBLICATIONS

"3GPP TS 29.212 V11.6.0 (Sep. 2012)", 3rd Generation Partnership Project; Technical Specification Group Core Network and Terminals; Policy and Charging Control (PCC) Reference points (Release 11).

(Continued)

*Primary Examiner* — Nathan Mitchell
(74) *Attorney, Agent, or Firm* — Kramer & Amado, P.C.

(57) ABSTRACT

Various embodiments relate to a method performed by a network node for terminating an S9 roaming session, the method including: receiving a Gx roaming session termination request; forwarding a corresponding S9 roaming session termination request to a controlling Policy and Charging Rule Function (PCRF) node; waiting a preconfigured time interval; and terminating the S9 roaming session without receiving an expected S9 acknowledgement message from the controlling PCRF node. Embodiments can include scheduling an IPCAN session audit for a selected IPCAN session of an S9 roaming session at preconfigured time intervals; generating an IPCAN session status request message; converting the IPCAN session status request message to a corresponding S9 status request message; forwarding the S9 status request message to a visited PCRF node; and responsive to receiving an S9 message indicating an unknown session from the visited PCRF node, removing the selected IPCAN session at the network node.

10 Claims, 5 Drawing Sheets

(56) References Cited

OTHER PUBLICATIONS

"3GPP TS 29.213 V11.4.0 (Sep. 2012)", 3rd Generation Partnership Project; Technical Specification Group Core Network and Terminals; Policy and Charging Control (PCC) signalling flows and Quality of Service (QoS) parameter mapping (Release 11).

"3GPP TS 29.214 V11.5.0 (Jun. 2012)", 3rd Generation Partnership Project; Technical Specification Group Core Network and Terminals; Policy and Charging Control over Rx reference point (Release 11).

"3GPP TS 29.215 V11.5.0 (Jun. 2012)", 3rd Generation Partnership Project; Technical Specification Group Core Network and Terminals; Policy and Charging Control (PCC) over S9 reference point; Stage 3 (Release 11).

U.S. Non-Final Office Action dated Apr. 11, 2018 in connection with related U.S. Appl. No. 15/395,722.

\* cited by examiner

S9 ROAMING SESSION CLEANUP WITH S9 CONNECTION FAILURE

CROSS REFERENCE TO RELATED APPLICATIONS

The present application is related to co-pending United States Patent Application entitled "S9 Roaming Session Destination Selection" (Ma et al.), filed concurrently herewith, the entire content of which is incorporated herein by reference.

FIELD OF INVENTION

The invention is directed to telecommunications networks and more specifically, to improved roaming session management in Evolved Packet Core (EPC) telecommunications networks.

BACKGROUND

In an effort to simplify the dual core approach of the, the 3rd Generation Partnership Project (3GPP) has recommended a new network scheme it terms "Long Term Evolution" (LTE). In an LTE network, all communications are carried over an IP channel from user equipment (UE) to an all-IP core called the Evolved Packet Core (EPC). The EPC then provides gateway access to other networks while ensuring an acceptable quality of experience (QoE) and charging a subscriber for their particular network activity The 3GPP generally describes the components of the EPC and their interactions with each other in a number of technical specifications. Specifically, 3GPP TS 29.212, 3GPP TS 29.213, 3GPP TS 29.214, and 3GPP TS 29.215 describe the Policy and Charging Rules Function (PCRF), Policy and Charging Enforcement Function (PCEF), Bearer Binding and Event Reporting Function (BBERF) of the EPC, and Policy and Charging Control (PCC) over S9 Reference Point. These specifications further provide some guidance as to how these elements interact in order to provide reliable data services and charge subscribers for use thereof.

A communications network of a network provider usually has a limited geographical range where it can provide communications services. Network subscribers usually subscribe to a single network. When a network subscriber is outside of the geographical range of the subscribed network, another network provider may provide network service to the subscriber, who is then considered a roaming subscriber in this visited network. The subscriber's home network and the visited network must negotiate in order to provide network service to the subscriber and correctly apportion the costs of the service. LTE networks use the S9 reference point to communicate between a visited PCRF (V-PCRF) node and a home PCRF (H_PCRF) node. The use of the S9 reference point can lead to some functional limitations in certain scenarios. Therefore, improvements to handling of Rx messages or IPCAN session messages without subscription IDs at a home-PCRF for roaming sessions would be highly desirable.

SUMMARY

A brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a network node for terminating an S9 roaming session The method comprises: receiving a Gx roaming session termination request; forwarding a corresponding S9 roaming session termination request to a controlling Policy and Charging Rule Function (PCRF) node; waiting a preconfigured time interval; and terminating the S9 roaming session without receiving an expected S9 acknowledgement message from the controlling PCRF node.

In various alternative embodiments, the Gx roaming session termination request comprises a Gx Credit Control Request (CCR) message with CC-Request-Type set to "TERMINATE_REQUEST".

In various alternative embodiments, the expected S9 acknowledgement message comprises a Credit Control Answer (CCA) message.

In various alternative embodiments, the network node comprises a visited PCRF node.

In various alternative embodiments, the controlling PCRF node comprises a home PCRF node.

Other embodiments of the invention provide a method performed by a network node in a home network, for terminating an S9 roaming session. The method comprises: scheduling an IPCAN session audit for a selected IPCAN session of an S9 roaming session at preconfigured time intervals; generating an IPCAN session status request message; converting the IPCAN session status request message to a corresponding S9 status request message; forwarding the S9 status request message to a visited PCRF node; and responsive to receiving an S9 message indicating an unknown session from the visited PCRF node, removing the selected IPCAN session at the network node.

In various alternative embodiments, the IPCAN session status request comprises a Gx Re-Authorization Request (RAR) message for the selected IPCAN session and the S9 message indicating an unknown session comprises an S9 Re-Auth-Answer (RAA) message.

Various alternative embodiments further comprise steps of removing any corresponding S9 sessions and any corresponding S9 subsessions at the visited PCRF node.

Other embodiments of the invention provide a tangible and non-transitory machine-readable storage medium encoded with instructions for execution at a network node, for terminating an S9 roaming session. The tangible and non-transitory machine-readable storage medium comprises instructions for: receiving a Gx roaming session termination request; forwarding a corresponding S9 roaming session termination request to a controlling Policy and Charging Rule Function (PCRF) node; waiting a preconfigured time interval; and terminating the S9 roaming session without receiving an expected S9 acknowledgement message from the controlling PCRF node.

Other embodiments of the invention provide a tangible and non-transitory machine-readable storage medium encoded with instructions for execution at a network node, for terminating an S9 roaming session. The tangible and non-transitory machine-readable storage medium comprises instructions for: scheduling an IPCAN session audit for a selected IPCAN session of an S9 roaming session at preconfigured time intervals; generating an IPCAN session status request message; converting the IPCAN session status request message to a corresponding S9 status request message; forwarding the S9 status request message to a visited PCRF node; and responsive to receiving an S9 message indicating unknown session from the visited PCRF node, removing the selected IPCAN session at the network node.

BRIEF DESCRIPTION OF THE FIGURES

Some embodiments of apparatus and/or methods in accordance with embodiments of the present invention are now described, by way of example only, and with reference to the accompanying drawings in which.

In the figures, like features are denoted by like reference characters.

DETAILED DESCRIPTION

Figure 1:
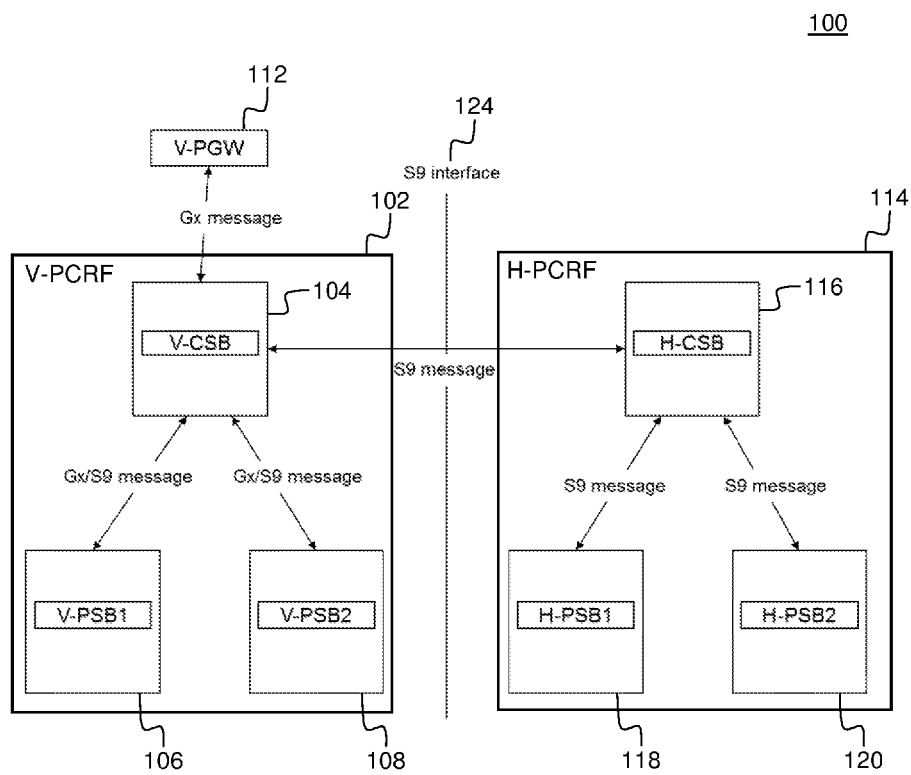
FIG. 1 illustrates a PCRF S9 roaming architecture.

Referring now to the drawings, in which like numerals refer to like components or steps, there are disclosed broad aspects of various exemplary embodiments.

FIG. 1 illustrates a Policy and Charging Rule Function (PCRF) S9 roaming architecture 100. In an advantageous embodiment of a PCRF node 102 or 114, message processing can be handled by a Common Service Blade (CSB) 104 or 116 which receives incoming communication session requests and routes these to multiple Policy Service Blades (PSBs) 106, 108 or 118, 120 which handle the policy control for the incoming communication sessions. Thus, one CSB can manage multiple PSBs. Sessions are created to track incoming messages based on the information in the incoming message. Session IDs are used by CSB in order to route subsequent related messages to the correct PSB. In a roaming scenario, the home network is served by H-PCRF 114 connected via S9 reference point 124 to V-PCRF 102 on the visited network. H represents the home network and V represents the visited network. Incoming Gx messages can be received at V-CSB 104 at V-PCRF 102 through a Gx interface. Incoming Rx messages can be received at V-CSB 104 at V-PCRF 102 through an Rx interface. Gx messages and S9 messages can be routed by V-CSB 104 to V-PSB1 106 and V-PSB2 108. Similarly, S9 messages can be routed by H-CSB 116 to H-PSB1 118 and H-PSB2 120. S9 interface 124 can carry S9 messages between V-CSB 104 at V-PCRF 102 and H-CSB 116 at PCRF 116.

Embodiments of the described S9 roaming session cleanup are applicable to three types of roaming sessions:

1) IPCAN session—on V-PCRF 102, an IPCAN session is triggered by a Gx message. On H-PCRF 114, an IPCAN session is triggered by S9 subsession creation.

2) S9 subsession—on V-PCRF 102, the S9 subsession is triggered by IPCAN session creation. On H-PCRF 114, the S9 subsession is triggered by an S9 message.

3) S9 session, which can contain multiple S9 subsessions. Its creation is triggered by S9 subsession creation. When a Gx message comes from V-PGW 112, both V-PSB and H-PSB create IPCAN session and S9 session/subsession.

Figure 2:
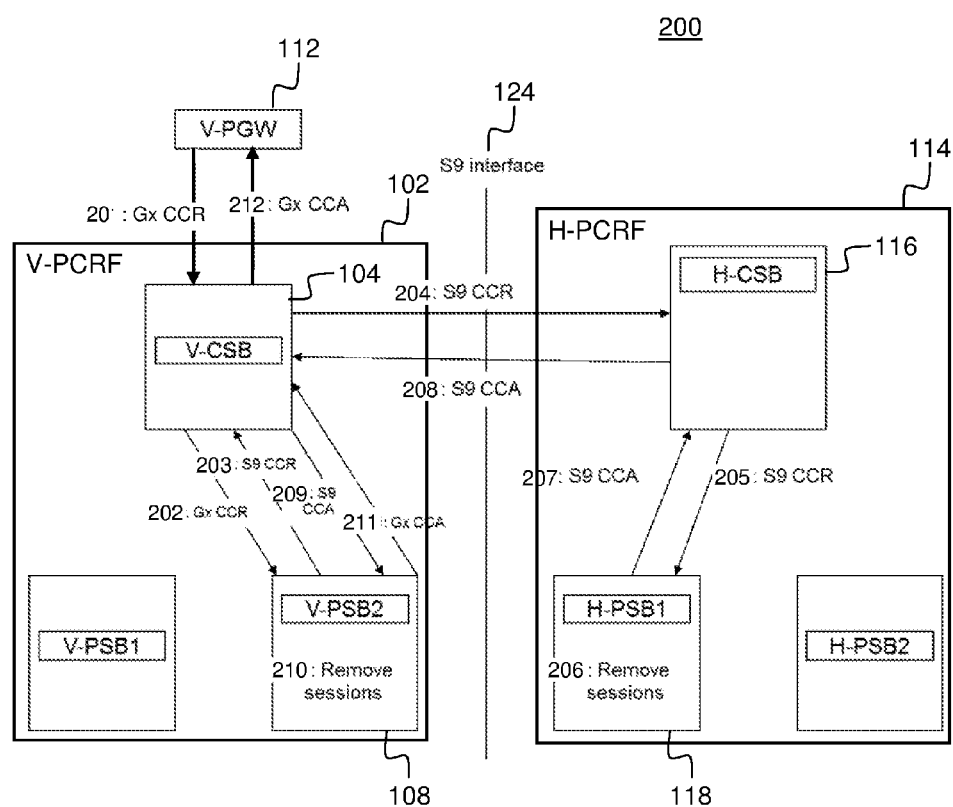
FIG. 2 illustrates a normal roaming session termination.

FIG. 2 illustrates a normal roaming session termination message flow. V-CSB 104 receives Diameter Gx session termination request message in the form of a Gx Credit Control Request (CCR) message 201 with CC-Request-Type set to "TERMINATE_REQUEST"), from V-PGW 112 and routes Gx CCR message 202 to V-PSB2 108 which converts the Gx message into an S9 message and returns S9 CCR message 203 which V-CSB 104 then forwards the termination request message as S9 CCR message 204 via S9 interface 124 to H-CSB 116. H-CSB 116 then routes the termination request message as S9 CCR message 205 to H-PSB1 118. H-PSB1 118 responds by removing the session (shown as step 206) and returns a Credit Control Answer (CCA) as S9 CCA message 206 which is forwarded to H-CSB 116 which then forwards the message as S9 CCA message 208 to V-CSB 104 via S9 interface 124. V-CSB 104 then routes the message as S9 CCA message 209 to V-PSB2 108 which by removes the session (shown as step 210) and returns a Gx format message as Gx CCA message 211 to V-CSB 104 which then forwards it as Gx CCA message 212 to V-PGW 112.

Figure 3:
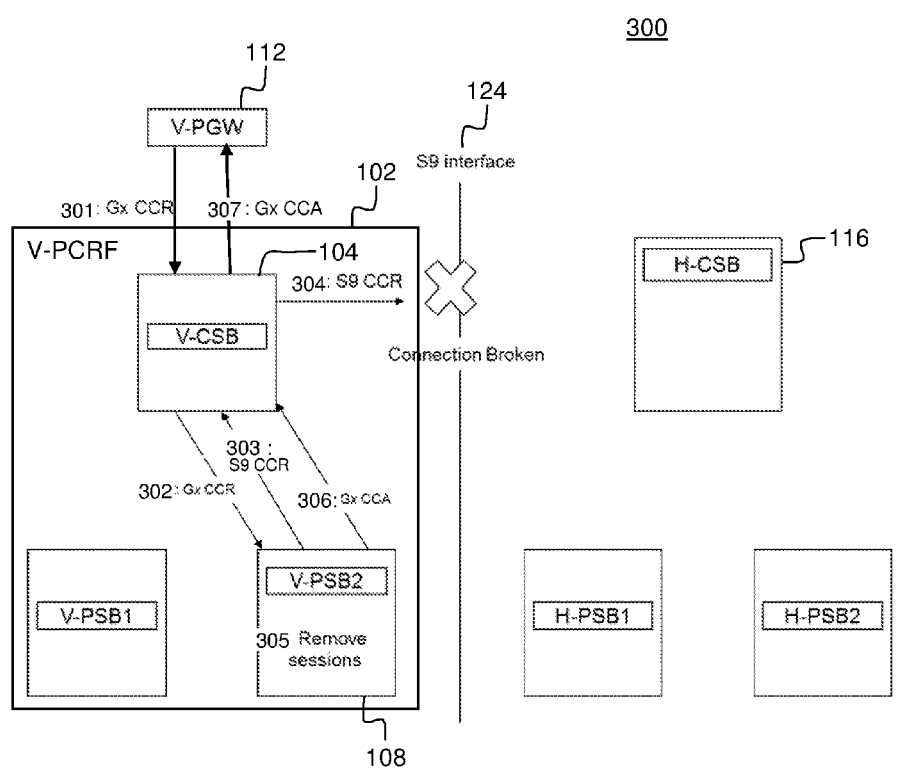
FIG. 3 illustrates a roaming session termination during connection failure.

FIG. 3 illustrates a message flow for the case of a roaming session termination during a connection failure of the S9 interface 124 between V-CSB 104 and H-CSB 116. V-CSB 104 receives Diameter Gx CCR session termination request message 301 from V-PGW 112 and routes Gx CCR session termination request message 302 to V-PSB2 108 which converts the Gx message into an S9 message and returns S9 CCR session termination request message 303 to V-CSB 104. V-PSB2 108 waits for a preconfigured time interval, for example, by starting a countdown timer to handle the possibility of S9 message delivery failure. The countdown timer can be configurable. For example, the countdown timer could be configured at 1 minute. Other suitable mechanisms for waiting for a preconfigured time interval, or providing for different values could be configured as would be apparent the persons of skill in the art. V-CSB 104 then attempts to forward the termination request message as S9 CCR message 304 via S9 interface 124 to H-CSB 116. Because the S9 interface 124 connection is broken, H-CSB 116 does not receive the message and will not respond to the termination request. After the countdown timer at V-PSB2 108 expires, V-PSB2 108 removes the session (shown as step 305) and then reports this to V-CSB 104 by sending Gx CCA message 306 to V-CSB 104 which then forwards it as Gx CCA message 307 to V-PGW 112. In this manner, roaming sessions can be terminated efficiently at a visited network, even in the case where communications between a visited network and a home network are disrupted.

Figure 4:
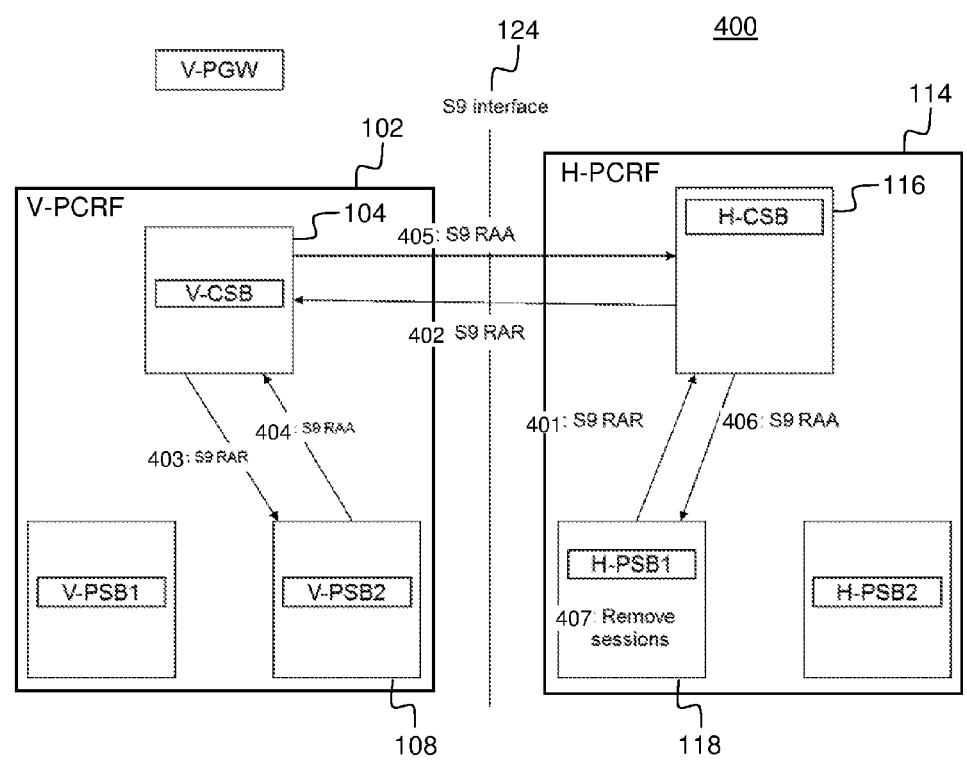
FIG. 4 illustrates a roaming session termination after connection recovery.

When the broken connection of S9 interface 124 shown in FIG. 3 is eventually restored, the home network still indicates the S9 session is active, even though the S9 session has been removed on the visited network. FIG. 4 illustrates a message flow for terminating an S9 roaming session at a home network after connection recovery of the S9 interface 124 between V-CSB 104 and H-CSB 116. H-PSB1 118 schedules a session audit task at regular intervals for each roaming IPCAN session active on H-PSB1 118. For example, the audit task could be scheduled on a 24-hour interval. The audit task could be scheduled in late evening or other times when network traffic is low or any other suitable interval and time. Thus, at some time after the connection of S9 interface 124 is restored, and as determined by the audit task schedule, H-PSB1 118 generates a Gx RAR message to query the status of the roaming session at the visited network. H-PSB1 118 converts the Gx RAR message to a corresponding S9 RAR message 401 before sending it to H-CSB 116. H-CSB 116 then forwards the message as S9 RAR message 402 to V-CSB 104 via S9 interface 124. V-CSB 104 then routes the message as S9 RAR message 403 to V-PSB2 108. Because the roaming session is already removed from V-PSB2 108, it responds by sending S9 RAA message 404 indicating unknown session, back to V-CSB 104 which forwards the message as S9 RAA 405 via S9 interface 124 to H-CSB 116 which then forwards it as S9 RAA 406 to H-PSB1 118. Upon receipt of this unknown session result, H-PSB1 118 removes the IPCAN session and its matched S9 subsession (shown as step 407). If this is the last S9 subsession within the S9 session, H-PSB1 118 may also remove the corresponding S9 session. In this manner, all the stale roaming sessions are removed from H-PSB1 118 and both visited and home network will have the same status for the roaming sessions. These procedures happen within V-PCRF 102 and H-PCRF 114 and does not require external messages to V-PGW 112 and therefore does not impact real call processing.

Note that V-PCRF 102 and H-PCRF 114 can be identical network nodes and their functionality can be interchanged depending on the roaming scenario, for example in the roaming scenario where a subscriber whose home network is associated with PCRF 102 originates a call on PCRF 114, then PCRF 114 would behave as a visited PCRF and PCRF 102 would behave as a home PCRF. Thus to maximize the benefits of the embodiments described with reference to FIG. 3 and FIG. 4, the functionality of both embodiments can be incorporated into each of H-PCRF 102 and V-PCRF 114, and more specifically, in each PSB 106, 108, 118, 120. In this manner, either PCRF 102, or 114, can cleanly manage a roaming session termination in the event of an S9 connection failure at both the home network and visited network.

Note also that the IP-CAN audit session described above can be scheduled on regular intervals and does not necessarily require an S9 connection failure to trigger the process. In this manner the audit session can address database inconsistencies between a home network and visited network.

Figure 5:
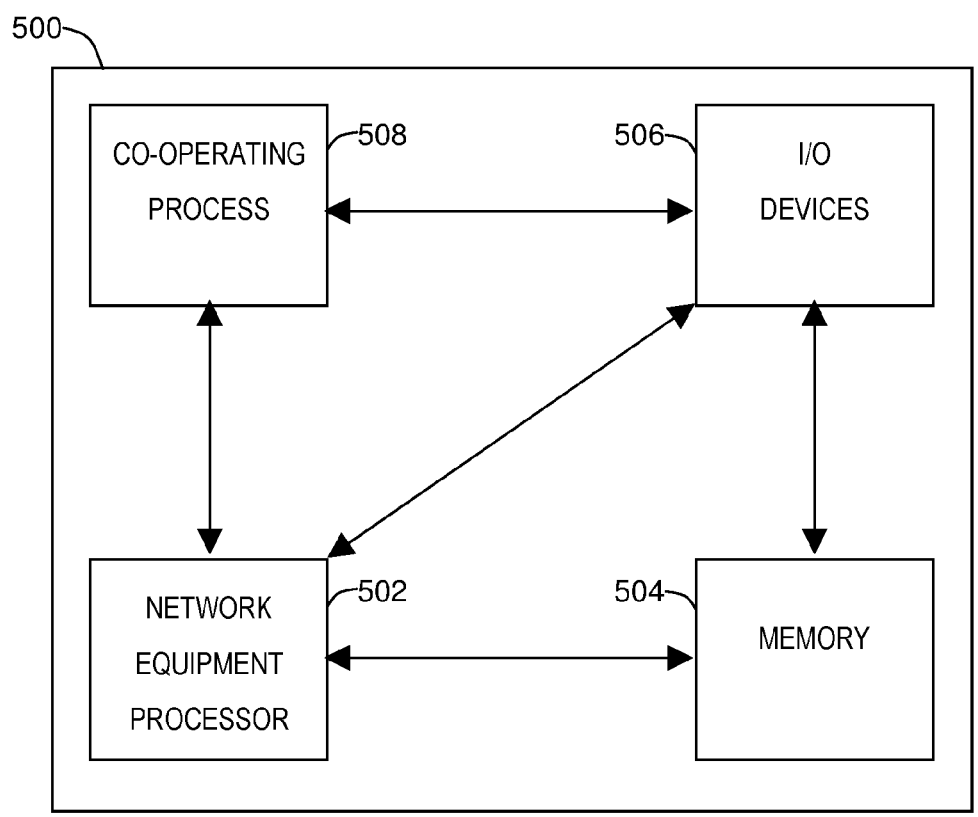
FIG. 5 illustrates a high-level block diagram of a network equipment processor assembly.

FIG. 5 depicts a high-level block diagram of a network equipment processor assembly suitable for use in performing functions described herein.

As depicted in FIG. 5, network equipment processor assembly 500 includes a network equipment processor element 502 (e.g., a central processing unit (CPU) and/or other suitable processor(s)), a memory 504 (e.g., random access memory (RAM), read only memory (ROM), and the like), a cooperating module/process 508, and various input/output devices 506 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in hardware, for example using one or more application specific integrated circuits (ASIC), and/or any other hardware equivalents. Alternatively, according to one embodiment, the cooperating process 508 can be loaded into memory 504 and executed by network equipment processor 502 to implement the functions as discussed herein. As well, cooperating process 508 (including associated data structures) can be stored on a tangible, non-transitory computer readable storage medium, for example magnetic or optical drive or diskette, semiconductor memory and the like.

It is contemplated that some of the steps discussed herein as methods may be implemented within hardware, for example, as circuitry that cooperates with the network equipment processor to perform various method steps. Portions of the functions/elements described herein may be implemented as a computer program product wherein computer instructions, when processed by a network equipment processor, adapt the operation of the network equipment processor such that the methods and/or techniques described herein are invoked or otherwise provided. Instructions for invoking the inventive methods may be stored in fixed or removable media, and/or stored within a memory within a computing device operating according to the instructions.

The functions of the various elements shown in the figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and nonvolatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation".

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof. Numerous modifications, variations and adaptations may be made to the embodiment of the invention described above without departing from the scope of the invention, which is defined in the claims.

What is claimed is:

1. A method performed by a network node for terminating an S9 roaming session, the method comprising:
   receiving a Gx roaming session termination request;
   forwarding a corresponding S9 roaming session termination request to a controlling Policy and Charging Rule Function (PCRF) node;
   waiting a preconfigured time interval; and
   terminating said S9 roaming session after the preconfigured time interval when said controlling PCRF node failed to respond to the forwarded S9 roaming session termination request with an expected S9 acknowledgement message.

2. The method of claim 1, wherein said Gx roaming session termination request comprises a Gx Credit Control Request (CCR) message with CC-Request-Type set to "TERMINATE_REQUEST".

3. The method of claim 1, wherein said expected S9 acknowledgement message comprises a Credit Control Answer (CCA) message.

4. The method of claim 1, wherein said network node comprises a visited PCRF node.

5. The method of claim 1, wherein said controlling PCRF node comprises a home PCRF node.

6. A tangible and non-transitory machine-readable storage medium encoded with instructions for execution at a network node for terminating an S9 roaming session, wherein the tangible and non-transitory machine-readable storage medium comprises:
   instructions for receiving a Gx roaming session termination request;
   instructions for forwarding a corresponding S9 roaming session termination request to a controlling Policy and Charging Rule Function (PCRF) node;
   instructions for waiting a preconfigured time interval; and
   instructions for terminating said S9 roaming session after the preconfigured time interval when said controlling PCRF node failed to respond to the forwarded S9 roaming session termination request with an expected S9 acknowledgement message.

7. The tangible and non-transitory machine-readable storage medium of claim 6, wherein said Gx roaming session termination request comprises a Gx Credit Control Request (CCR) message with CC-Request-Type set to "TERMINATE_ REQUEST".

8. The tangible and non-transitory machine-readable storage medium of claim 6, wherein said expected S9 acknowledgement message comprises a Credit Control Answer (CCA) message.

9. The tangible and non-transitory machine-readable storage medium of claim 6, wherein said network node comprises a visited PCRF node.

10. The tangible and non-transitory machine-readable storage medium of claim 6, wherein said controlling PCRF node comprises a home PCRF node.

* * * * *